(12) United States Patent
Oba et al.

(10) Patent No.: US 10,245,947 B2
(45) Date of Patent: Apr. 2, 2019

(54) VEHICLE INCLUDING A SHIFTABLE TRANSMISSION WITH OPERATION LEVER

(71) Applicant: YAMAHA HATSUDOKI KABUSHIKI KAISHA, Iwata-shi, Shizuoka (JP)

(72) Inventors: Shigeaki Oba, Shizuoka (JP); Seiji Nakagaki, Shizuoka (JP); Hiroyuki Fujimoto, Shizuoka (JP); Tomoyuki Hayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/027,407

(22) Filed: Jul. 5, 2018

(65) Prior Publication Data

US 2019/0061522 A1    Feb. 28, 2019

(30) Foreign Application Priority Data

Aug. 22, 2017    (JP) ................. 2017-159748

(51) Int. Cl.

| | |
|---|---|
| *B60K 23/02* | (2006.01) |
| *B60N 2/01* | (2006.01) |
| *B60K 17/04* | (2006.01) |
| *B60K 15/03* | (2006.01) |
| *B60K 5/00* | (2006.01) |
| *B60K 17/34* | (2006.01) |

(52) U.S. Cl.
CPC ............. *B60K 23/02* (2013.01); *B60K 5/00* (2013.01); *B60K 15/03* (2013.01); *B60K 17/04* (2013.01); *B60N 2/01* (2013.01); *B60K 17/34* (2013.01)

(58) Field of Classification Search
CPC ........................................ B62K 23/02
See application file for complete search history.

(56) References Cited

U.S. PATENT DOCUMENTS

| | | | |
|---|---|---|---|
| 6,076,624 A | 6/2000 | Izumi et al. | |
| 6,182,784 B1 * | 2/2001 | Pestotnik | B60K 5/06 180/337 |
| 7,505,842 B2 * | 3/2009 | Luh | B60W 30/182 477/43 |
| 8,381,855 B2 | 2/2013 | Suzuki et al. | |
| 8,684,887 B2 * | 4/2014 | Krosschell | F16H 63/50 477/44 |
| 9,151,384 B2 * | 10/2015 | Kohler | F16H 63/50 |

FOREIGN PATENT DOCUMENTS

JP    10-297294 A    11/1998

* cited by examiner

*Primary Examiner* — James A Shriver, II
*Assistant Examiner* — James J Triggs
(74) *Attorney, Agent, or Firm* — Keating and Bennett, LLP

(57) ABSTRACT

A vehicle includes an engine, a continuously variable transmission, a shiftable transmission, a switching lever, a shift rod, and an operation lever. The continuously variable transmission is located at a side of the engine. The shiftable transmission is located on the same side as the engine in a right-left direction with respect to the continuously variable transmission. The switching lever is located on the same side as the continuously variable transmission with respect to a center of the shiftable transmission in the right-left direction, and inputs a shifting operation force into the shiftable transmission. The shift rod is linked to the switching lever. The operation lever is operated by a driver seated on the seat to shift the shiftable transmission, and is linked to the shift rod.

9 Claims, 7 Drawing Sheets

VEHICLE INCLUDING A SHIFTABLE TRANSMISSION WITH OPERATION LEVER

CROSS REFERENCE TO RELATED APPLICATIONS

This application claims the benefit of priority to Japanese Patent Application No. 2017-159748 filed on Aug. 22, 2017. The entire contents of this application are hereby incorporated herein by reference.

BACKGROUND OF THE INVENTION

1. Field of the Invention

The present invention relates to a vehicle that includes a shiftable transmission, an operation lever shifted by a driver, and a shift rod connecting the shiftable transmission and the operation lever.

2. Description of the Related Art

A left-hand drive vehicle described in U.S. Pat. No. 8,381,855 includes a driver's seat and a passenger's seat that are aligned right and left, and an engine unit located between the seats. The engine unit includes an engine main body and a continuously variable transmission located to the left of the engine main body. Shifting is performed when a driver seated on the driver's seat operates an operation lever located adjacent to the right of the driver's seat, forward or rearward.

A vehicle described in Japanese Patent Application Publication No. 10-297294 includes a seat on which a driver sits by straddling, a fuel tank provided in front of the seat, a bar handle located in front of the fuel tank, an engine located below the fuel tank, and a power transmission coupled to the engine. The power transmission includes a centrifugal clutch linked to a crankshaft of the engine, a continuously variable transmission linked to a clutch output shaft of the centrifugal clutch, and a transmission that is linked to a main shaft of the continuously variable transmission and is shiftable. A rotational power of the engine is transmitted to vehicle wheels via the centrifugal clutch, the continuously variable transmission, and the transmission.

The continuously variable transmission in Japanese Patent Application Publication No. 10-297294 includes a primary shaft to which a rotational power of the crankshaft of the engine is applied via the centrifugal clutch, and the main shaft to which the rotation of the primary shaft is applied via a V-belt. The transmission includes a drive shaft, an output shaft, a plurality of transmission gears, and a dog clutch. The plurality of transmission gears are rotatably provided on the drive shaft. The dog clutch is splined to the drive shaft and is engageable with any of the transmission gears by sliding in an axial direction on the drive shaft. The plurality of transmission gears are respectively engaged with a plurality of gears fixed to the main shaft, and the rotation of the main shaft is transmitted to the plurality of transmission gears at different gear ratios. A gear fixed to the drive shaft is engaged with a gear fixed to the output shaft and the rotation of the drive shaft is thereby transmitted to the output gear. Shifting is achieved by switching the transmission gear engaged with the dog clutch.

With the power transmission of Japanese Patent Application Publication No. 10-297294, the main shaft is located above a horizontal plane passing through an axial center of the crankshaft of the engine, and the drive shaft and the output shaft are located above and below, below the horizontal plane, as represented best in FIG. 3 of Japanese Patent Application Publication No. 10-297294. Compactification in relation to an up-down direction and a front-rear direction is thereby achieved (see paragraphs 0046 and 0050 of Japanese Patent Application Publication No. 10-297294).

The present inventor examined combining an engine and a power transmission, such as that described in Japanese Patent Application Publication No. 10-297294, with a vehicle of an arrangement such as described in U.S. Pat. No. 8,381,855. A transmission includes, in its interior, a shift fork for sliding a dog clutch and is required to include, at its exterior, a switching lever for driving the shift fork. An operation lever operated by a driver is located based on convenience of operation, and disposition of the switching lever is designed based on structures of the transmission and its periphery. Therefore, generally with a vehicle such as that of U.S. Pat. No. 8,381,855, a shift rod coupling the operation lever and the switching lever is included. That is, when the driver operates the operation lever to perform shifting, an operation force (shifting operation force) thereof is transmitted to the switching lever via the shift rod.

With the arrangement of Japanese Patent Application Publication No. 10-297294, the continuously variable transmission occupies a front end region of a left portion of the power transmission and faces substantially an entirety of a left side surface of the transmission. It is therefore appropriate to dispose the switching lever at a front end region of a right portion (for example, a right side surface) of the power transmission. If this arrangement is to be applied to the vehicle of U.S. Pat. No. 8,381,855, the shift rod is coupled to the switching lever upon extending obliquely rearward to the right from the operation lever adjacent to the right of the driver's seat.

However, with such an arrangement, while an ordinary operation direction of the operation lever and an ordinary operation direction of the switching lever are substantially in the front-rear direction, the shift rod is located obliquely at a large angle with respect to the front-rear direction. It was discovered that the shifting operation force is thus not transmitted efficiently to the switching lever and an operation sensation therefore becomes poor. That is, if an intersection angle in plan view of the operation direction of the operation lever and the shift rod is large, a proportion of the driver's shifting operation force that is lost by a component force in a right-left direction increases. The shifting operation force must therefore include the force that is lost as the component force in the right-left direction in addition to the force required for actuation of the switching lever, and therefore a shift load required for the driver to operate the operation lever increases and an operation feeling therefore may become poor. Moreover, the shift rod is required to have high strength to bear the large shifting operation force.

SUMMARY OF THE INVENTION

In order to overcome the previously unrecognized and unsolved challenges described above, preferred embodiments of the present invention provide vehicles that each include two seats juxtaposed in the right-left direction, an engine, a continuously variable transmission, a shiftable transmission, a transmission, a switching lever, a shift rod, and an operation lever. At least a portion of the engine is located between the two seats in plan view. A rotational power from the engine is transmitted to the continuously variable transmission. The continuously variable transmission is located at a side of the engine, and at least a portion of the continuously variable transmission is located below one of the seats in plan view. The shiftable transmission is shiftable. A rotational power from the continuously variable transmission is transmitted to the shiftable transmission. The shiftable transmission is located on a same side as the engine in a right-left direction with respect to the continuously variable transmission. The transmission transmits the rotational power transmitted from the shiftable transmission to a vehicle wheel. The switching lever is located on the same side as the continuously variable transmission with respect to a center of the shiftable transmission in the right-left direction, and inputs a shifting operation force into the shiftable transmission. The shift rod is linked to the switching lever. The operation lever is operated by a driver seated on the seat to shift the shiftable transmission, and is linked to the shift rod.

In accordance with a preferred embodiment of the present invention, the continuously variable transmission is located at a side of the engine, and the shiftable transmission is located on the same side as the engine in the right-left direction with respect to the continuously variable transmission. The switching lever which inputs the shifting operation force applied to the operation lever by the driver to the shiftable transmission, is located on the same side as the continuously variable transmission with respect to the center of the shiftable transmission in the right-left direction. With the above layout, at least a portion of the engine is located between the two seats, at least a portion of the continuously variable transmission is located below one of the seats, and therefore if the shiftable transmission is located appropriately in a vicinity of these components, the switching lever is enabled to be located at a position between the two seats or a vicinity thereof. The operation lever is located at a position at which it is easily operable by the driver seated on one of the seats, for example, a position between the two seats or a vicinity thereof. A design where the switching lever and the operation lever are located at the same or substantially the same position in regard to the right-left direction is thus possible, and a design is enabled where the shift rod that connects these levers is located along the front-rear direction or substantially the front-rear direction.

Especially when an operation direction of the operation lever is the front-rear direction or substantially the front-rear direction, an intersection angle in plan view of the operation direction of the operation lever and the shift rod is small. A proportion of the driver's shifting operation force that is lost by a component force in a right-left direction is thus decreased. A large shifting operation force is thus unnecessary and therefore the strength of the shift rod does not have to be increased more than necessary. Also, transmission efficiency of the shifting operation force from the operation lever to the switching lever is improved, and therefore the driver is able to operate the operation lever even with a small shift load. That is, a reduction of the shift load is enabled.

In a preferred embodiment of the present invention, the shiftable transmission is located in front of the engine. In accordance with this preferred embodiment, the switching lever provided to the shiftable transmission is close to the operation lever, and therefore the shift rod is able to be short. The transmission efficiency of the shifting operation force from the operation lever to the switching lever is thus improved to further reduce the shift load.

In a preferred embodiment of the present invention, the switching lever is located between a center of the continuously variable transmission in the right-left direction and the center of the shiftable transmission in the right-left direction in plan view. In accordance with this preferred embodiment, the switching lever is reliably located on the same side as the continuously variable transmission with respect to the center of the shiftable transmission in regard to the right-left direction.

In a preferred embodiment of the present invention, the engine includes an output shaft oriented in the right-left direction. In this case, the continuously variable transmission includes a first input shaft into which a rotational power from the output shaft is input, and a first output shaft located farther forward than the first input shaft and that outputs the rotational power input into the first input shaft. The shiftable transmission includes a second input shaft which is located farther forward than the first output shaft and into which the rotational power output from the first output shaft is input, and a second output shaft located farther forward than the second input shaft and that outputs the rotational power input into the second input shaft to the transmission. The switching lever is preferably provided at a projection of the shiftable transmission that projects farther forward than the continuously variable transmission.

In accordance with the preferred embodiment described above, due to the first input shaft, the first output shaft, the second input shaft, and the second output shaft being located in a layout such as described above, the projection projecting farther forward than the continuously variable transmission is able to be located at the shiftable transmission. By locating the switching lever at the projection, the switching lever is reliably located on the same side as the continuously variable transmission with respect to the center of the shiftable transmission in regard to the right-left direction.

Also, the second input shaft and the second output shaft of the shiftable transmission are located farther forward than the first output shaft of the continuously variable transmission, and therefore the first output shaft of the continuously variable transmission is able to be located at a low position. Designing at least a portion of the continuously variable transmission to be located below a seat is thus facilitated.

In a preferred embodiment of the present invention, the switching lever is provided at a side surface of the projection that is closer to the continuously variable transmission. In accordance with this preferred embodiment, the switching lever is reliably located on the same side as the continuously variable transmission with respect to the center of the shiftable transmission in regard to the right-left direction. Also, the switching lever is able to be located making effective use of a space in front of the continuously variable transmission.

In a preferred embodiment of the present invention, at least a portion of the projection is located between the two seats in plan view. In accordance with this preferred embodiment, at least a portion of the shiftable transmission, which is a heavy object, is located at a center or substantially a center of the vehicle in the right-left direction as with the engine, thus improving the motion performance of the vehicle.

In a preferred embodiment of the present invention, the switching lever and the operation lever are located between the two seats in plan view. In accordance with this preferred embodiment, the switching lever and the operation lever are aligned in the front-rear direction or substantially in the front-rear direction between the two seats, and therefore the shift rod connecting these levers is able to be located along the front-rear direction or substantially along the front-rear direction. Thus, when the operation direction of the operation lever is the front-rear direction or substantially the front-rear direction, the proportion of the driver's shifting operation force lost by the component force in the right-left direction is decreased. Therefore, as mentioned above, the strength of the shift rod does not have to be increased more than necessary and the shift load is reduced.

In a preferred embodiment of the present invention, the switching lever is located at the center or substantially the center of the vehicle in the right-left direction. In accordance with this preferred embodiment, the shiftable transmission including the switching lever is able to be located close to the center of the vehicle in the right-left direction, thus improving the motion performance of the vehicle.

In a preferred embodiment of the present invention, the vehicle further includes a fuel tank that stores fuel for the engine and is located at a position of sandwiching the engine with the continuously variable transmission. In accordance with this preferred embodiment, the continuously variable transmission is spaced away from the fuel tank, and therefore maintenance of the continuously variable transmission is able to be performed without removing the fuel tank from the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the preferred embodiments of the present invention described below, front-rear, right-left, and up-down are directions defined based on a viewpoint of a driver sitting on a seat of a vehicle and facing a steering wheel. The right-left direction is a vehicle width direction of the vehicle. Also, the description shall be provided based on a state where the vehicle is on a horizontal plane.

Figure 1:
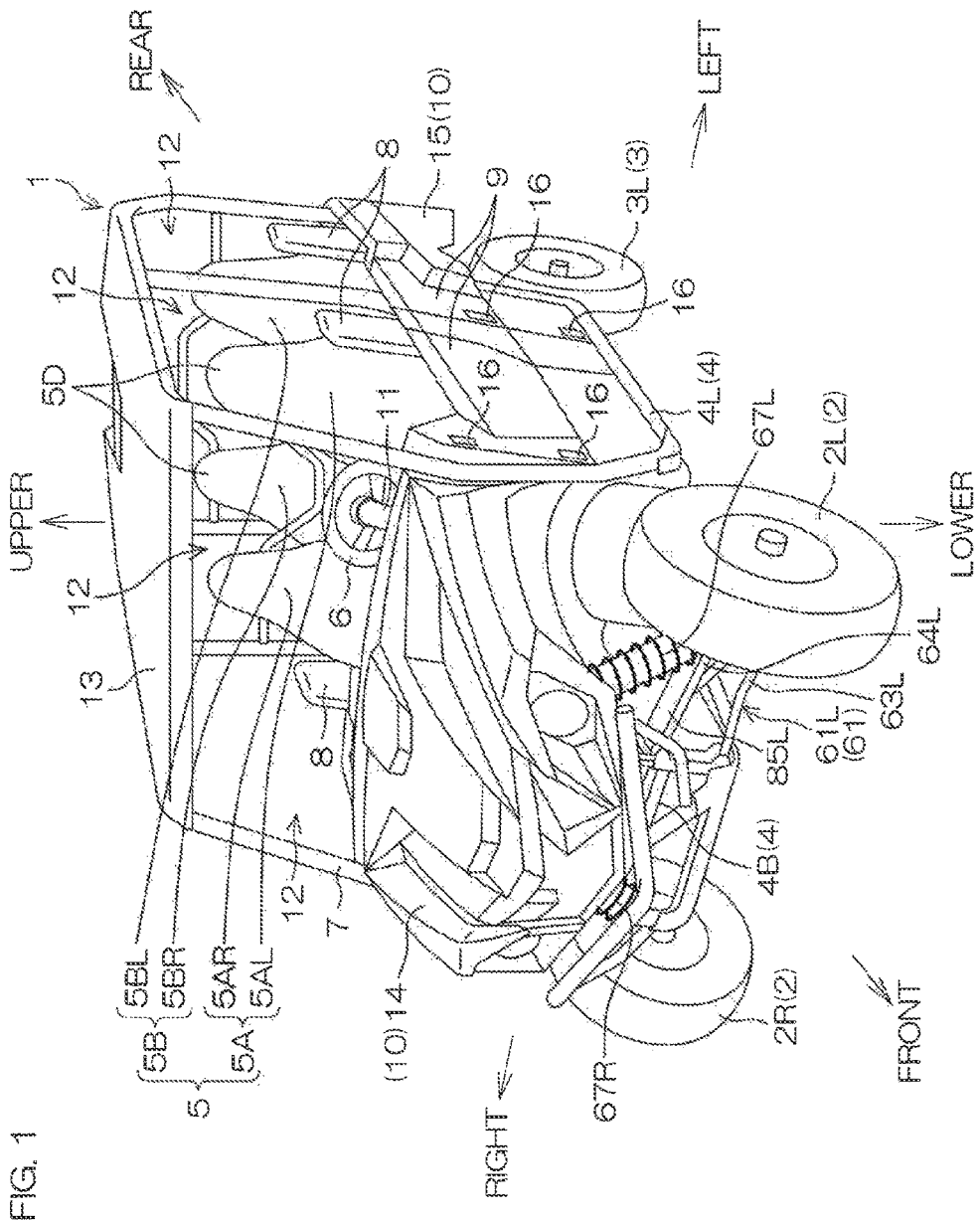
FIG. 1 is a schematic perspective view of a vehicle according to a preferred embodiment of the present invention.

FIG. 1 is a schematic perspective view of the vehicle 1 according to a preferred embodiment of the present invention. The vehicle 1 is preferably a utility vehicle and more specifically is preferably a four-wheel drive, all-terrain vehicle that is called a recreational off-road vehicle and travels through forests, deserts, etc.

The vehicle 1 includes a pair of right and left front wheels 2, a pair of right and left rear wheels 3, a frame 4, at least one seat 5, a steering wheel 6, a roll cage 7, bolsters 8, doors 9, and a body panel 10.

The pair of right and left front wheels 2 include a right front wheel 2R and a left front wheel 2L that are aligned in the right-left direction. The pair of right and left rear wheels 3 include a right rear wheel 3R and a left rear wheel 3L that are aligned in the right-left direction and located farther rearward than the front wheels 2. Each of the left front wheel 2L, right front wheel 2R, left rear wheel 3L, and right rear wheel 3R includes a tire. Recesses and projections in a block pattern to travel on rough terrain may be provided on a surface of each tire. A wheelbase of the vehicle 1 is preferably short and the vehicle width is narrow in order to travel with good maneuverability even in narrow locations such as between trees, etc.

The frame 4 defines a vehicle body of the vehicle 1. The frame 4 is supported by the pair of right and left front wheels 2 and the pair of right and left rear wheels 3. The frame 4 is preferably made of a metal, such as iron or aluminum, etc., and includes an intermediate frame 4A, a left frame 4L, a right frame 4R, a front frame 4B, a rear frame 4C, and an upper frame 4D (see FIG. 2 described below). The left frame 4L is provided at the left of the intermediate frame 4A. The right frame 4R is provided at the right of the intermediate frame 4A. The front frame 4B is provided in front of the intermediate frame 4A. The rear frame 4C is provided at the rear of the intermediate frame 4A. The upper frame 4D is provided above the rear frame 4C.

The vehicle 1 of the present preferred embodiment preferably seats four people, for example. Accordingly, the seats 5 include a pair of right and left front seats 5A and a pair of right and left rear seats 5B. The front seats 5A and the rear seats 5B are respectively located such that a plurality of occupants are seated alongside each other in the right-left direction. The pair of right and left front seats 5A include a right front seat 5AR and a left front seat 5AL that are aligned in the right-left direction. The pair of right and left rear seats 5B include a right rear seat 5BR and a left rear seat 5BL that are aligned in the right-left direction and located farther rearward than the front seats 5A. One of the front seats 5A, for example, the left front seat 5AL is a driver's seat on which the driver sits while facing forward. Each of the seats 5 includes a seat portion 5C and a backrest 5D rising from a rear end of the seat portion 5C, and an upper surface of the seat portion 5C is a seat surface 5E of the seat 5 (see FIG. 3 described below). The seat surface 5E may be a horizontal or substantially horizontal flat surface or may be a downwardly recessed, concave, curved surface. The seat surfaces 5E of the left front seat 5AL and the right front seat 5AR are mutually at the same or substantially the same height position. The seat surfaces 5E of the left rear seat 5BL and the right rear seat 5BR are mutually at the same or substantially the same height position. The seat surfaces 5E of the front seats 5A and the seat surfaces 5E of the rear seats 5B may be at the same or substantially the same height position.

The steering wheel 6 is located in front of the left front seat 5AL. A steering shaft 11 is mounted so as to be rotatable around its axis to the frame 4. The steering wheel 6 is coupled to a rear end of the steering shaft 11.

The roll cage 7 is mounted to the frame 4 and surrounds the pair of front seats 5A and the rear seats 5B. The roll cage 7 defines openings 12, one each at the left of the left front seat 5AL, the right of the right front seat 5AR, the left of the left rear seat 5BL, and the right of the right rear seat 5BR, for boarding and exiting of the occupants. A roof 13 is coupled to an upper portion of the roll cage 7.

The bolsters 8 are plate members made of, for example, resin and one each is provided adjacent to the left of the left front seat 5AL, adjacent to the right of the right front seat 5AR, adjacent to the left of the left rear seat 5BL, and adjacent to the right of the right rear seat 5BR. Each bolster 8 faces the occupant seated on the corresponding seat 5 from the outer side in the right-left direction and helps contain the occupant.

The doors 9 are provided one each at each opening 12, are mounted to the frame 4 via hinges 16, and are able to open and close by swinging around vertical axes. Each of the doors 9 in FIG. 1 is at a closed position and closes a lower region of an opening 12. When an occupant swings a door 9 outward, the door 9 is located at an open position and opens the lower region of an opening 12.

The body panel 10 is made, for example, of resin and is mounted to the frame 4. The body panel 10 includes a front panel 14 covering a front portion of the vehicle 1 farther forward than the front seats 5A, and a rear panel 15 covering a rear portion of the vehicle 1 farther rearward than the rear seats 5B. The doors 9 may define a portion of the body panel 10.

Figure 2:
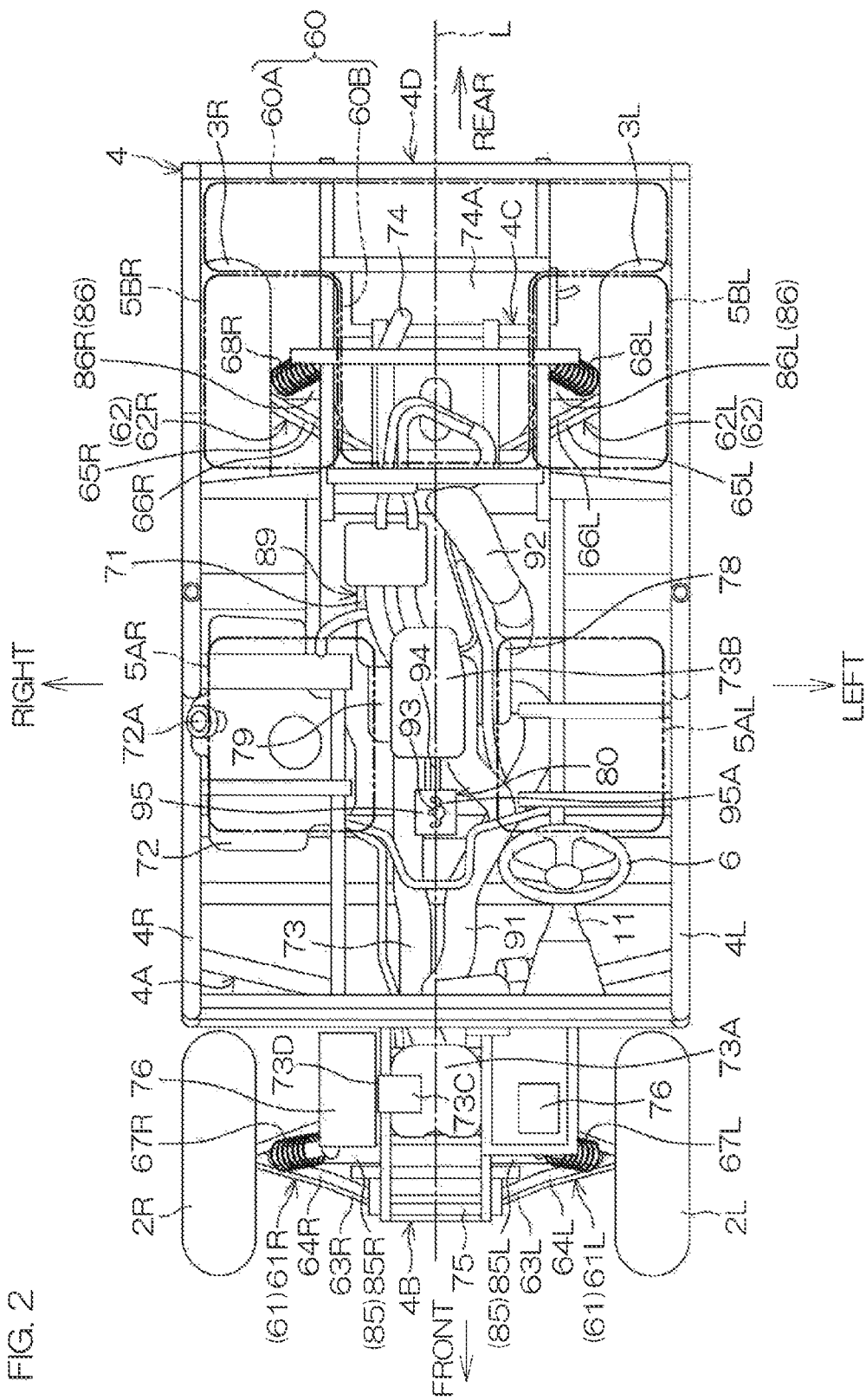
FIG. 2 is a schematic plan view of a vehicle in a state where a roof and a body panel, etc., are removed.

FIG. 2 is a schematic plan view of the vehicle 1 in a state where the roll cage 7, the doors 9, the body panel 10, and the roof 13 are removed.

The vehicle 1 includes a rear deck 60. The rear deck 60 includes a laterally elongated portion 60A located farther rearward than the rear seat 5B, and a projection 60B projecting forward from a center of the laterally elongated portion 60A and located between the left rear seat 5BL and the right rear seat 5BR, and is T-shaped or substantially T-shaped in plan view.

The vehicle 1 includes a pair of right and left front suspensions 61 suspending the pair of right and left front wheels 2 respectively, and a pair of right and left rear suspensions 62 suspending the pair of right and left rear wheels 3 respectively. The pair of right and left front suspensions 61 include a front suspension 61R suspending the right front wheel 2R, and a front suspension 61L suspending the left front wheel 2L. The pair of right and left rear suspensions 62 include a rear suspension 62R suspending the right rear wheel 3R, and a rear suspension 62L suspending the left rear wheel 3L. The frame 4 is supported by the pair of front wheels 2 and the pair of rear wheels 3 via the suspensions 61L, 61R, 62L, and 62R. The suspensions 61L, 61R, 62L, and 62R in the present preferred embodiment are preferably of the double wishbone type.

The front suspension 61L includes a front upper arm 64L and a front lower arm 63L aligned in the up-down direction. The front suspension 61R includes a front upper arm 64R and a front lower arm 63R aligned in the up-down direction. The right and left pair of front lower arms 63R and 63L are an example of front arms according to a preferred embodiment of the present invention. Each of the front lower arms 63L and 63R and the front upper arms 64L and 64R is preferably an A-arm.

A left end of each of the front lower arm 63L and the front upper arm 64L is coupled to a knuckle arm (not shown) of the front wheel 2L. A right end of each of the front lower arm 63R and the front upper arm 64R is coupled to a knuckle arm (not shown) of the front wheel 2R. The front lower arms 63R and 63L and the front upper arms 64R and 64L support the right and left front wheels 2R and 2L. A right end of each of the front lower arm 63L and the front upper arm 64L is mounted to the front frame 4B so as to be swingable up and down. A left end of each of the front lower arm 63R and the front upper arm 64R is mounted to the front frame 4B so as to be swingable up and down.

A lower end of a shock absorber 67L is coupled to a left end portion of the front upper arm 64L, and a lower end of a shock absorber 67R is coupled to a right end portion of the front upper arm 64R. Upper ends of the shock absorbers 67L and 67R are coupled to the front frame 4B.

The rear suspension 62L includes a rear upper arm 66L and a rear lower arm 65L aligned in the up-down direction. The rear suspension 62R includes a rear upper arm 66R and a rear lower arm 65R aligned in the up-down direction. The right and left pair of rear lower arms 65R and 65L are an example of rear arms according to a preferred embodiment of the present invention. Each of the rear lower arms 65L and 65R and the rear upper arms 66L and 66R is preferably an A-arm.

A left end of each of the rear lower arm 65L and the rear upper arm 66L is coupled to a knuckle arm (not shown) of the rear wheel 3L. A right end of each of the rear lower arm 65R and the rear upper arm 66R is coupled to a knuckle arm (not shown) of the rear wheel 3R. The rear lower arms 65R and 65L and the rear upper arms 66R and 66L support the right and left rear wheels 3R and 3L. A right end of the rear lower arm 65L is mounted to the rear frame 4C so as to be swingable up and down. A right end of the rear upper arm 66L is mounted to the frame 4 so as to be swingable up and down. A left end of the rear lower arm 65R is mounted to the rear frame 4C so as to be swingable up and down. A left end of the rear upper arm 66R is mounted to the frame 4 so as to be swingable up and down.

A lower end of a shock absorber 68L is coupled to a left end portion of the rear upper arm 66L, and a lower end of a shock absorber 68R is coupled to a right end portion of the rear upper arm 66R. Upper ends of the shock absorbers 68L and 68R are coupled to the upper frame 4D.

Figure 3:
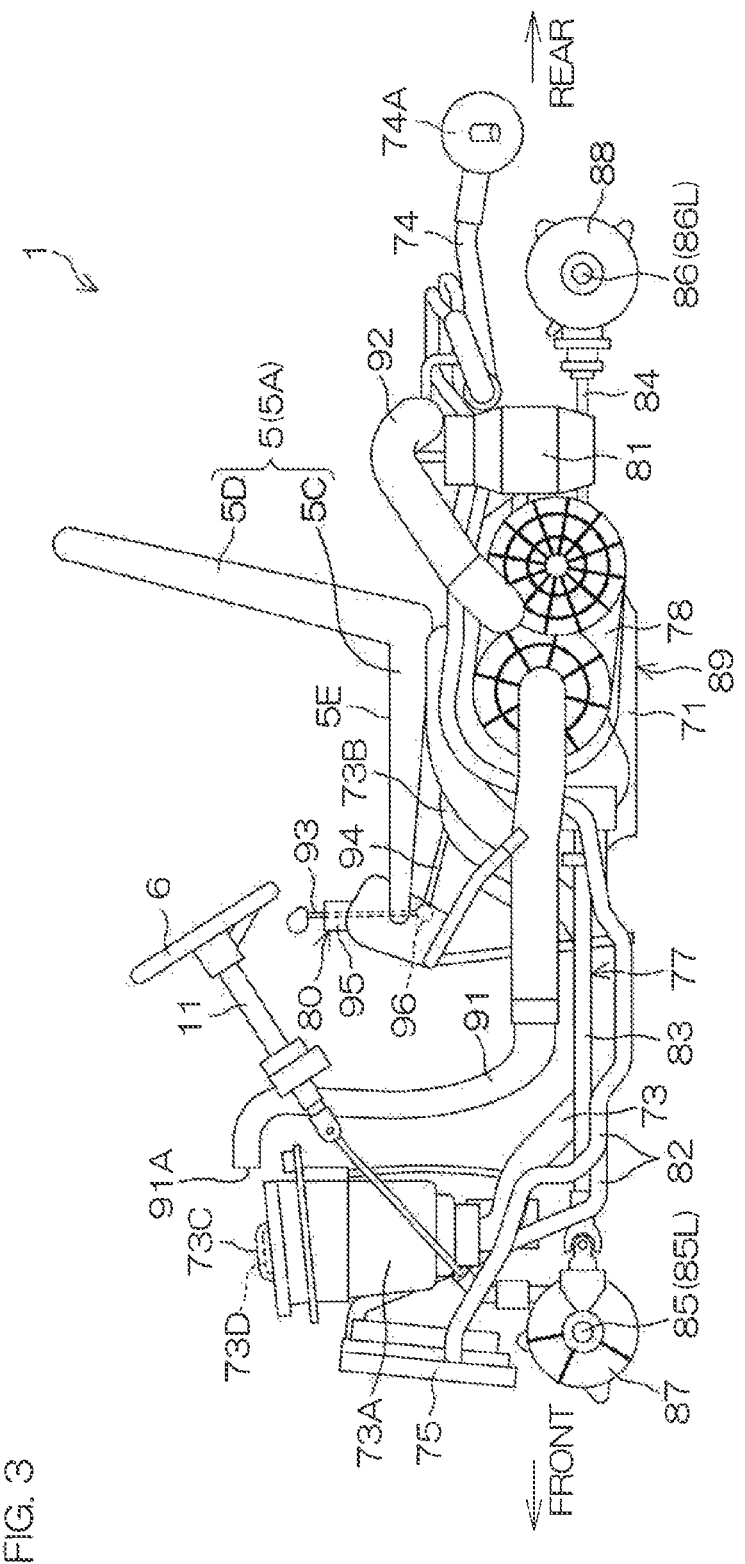
FIG. 3 is a schematic side view of the vehicle in a state where the roof, the body panel, and a frame, etc., are removed.

FIG. 3 is a schematic left side view of the vehicle 1 in a state where the frame 4, the roll cage 7, the doors 9, the body panel 10, the roof 13, etc., are removed. Referring to FIG. 2 and FIG. 3, the vehicle 1 includes an engine 71, a fuel tank 72, an intake passage 73, an exhaust passage 74, a radiator 75, batteries 76, a transmission 77, a continuously variable transmission 78, a shiftable transmission 79, and a shifter 80.

The engine 71 is preferably an internal combustion engine and is, for example, a water-cooled, four-cycle, parallel two-cylinder engine in the present preferred embodiment. The engine 71 is coupled to and supported by the intermediate frame 4A. The engine 71 is located at a center of the vehicle 1 in regard to the right-left direction. Specifically, at least a portion of the engine 71 overlaps with a virtual centerline L passing through the center of the vehicle 1 and extending in the front-rear direction in plan view. At least a front end portion of the engine 71 is located between the two front seats 5A in plan view. The engine 71 is located at a position lower than the seat surfaces 5E of the respective front seats 5A. The engine 71 is, for example, a dry-sump engine, and an oil tank 81 that stores engine oil for the engine 71 is located to the rear of the engine 71.

The fuel tank 72 stores fuel for the engine 71. The fuel for the engine 71 is, for example, gasoline. The fuel tank 72 is located to the right of the engine 71 so as to be aligned with the engine 71 in the right-left direction and is coupled to the intermediate frame 4A. The fuel tank 72 is located at a position lower than the seat surfaces 5E of the respective seats 5A and at least a portion of the fuel tank 72 overlaps with the right front seat 5AR in plan view. A fuel inlet (not shown) and a fuel cap 72A that opens and closes the fuel inlet are provided at a right end portion of an upper surface of the fuel tank 72.

The intake passage 73 extends in the front-rear direction at a position lower than the feet of the occupants seated on the front seats 5. An intake box 73A is provided at a front end portion of the intake passage 73 and an accumulator 73B is provided at a rear end portion of the intake passage 73. The intake box 73A is coupled to the front frame 4B. A projection 73C projects upward from an upper surface of the intake box 73A. An air inlet 73D that takes air into the intake box 73A is provided, for example, in a right surface of the projection 73C. The accumulator 73B is located in front of the engine 71 and is connected to intake ports (not shown) at the respective cylinders of the engine 71 via a throttle body (not shown). Air at a periphery of the intake box 73A is taken into the intake box 73A from the air inlet 73D. The air taken into the intake box 73A is cleaned by passing through a filter (not shown) inside the intake box 73A. The cleaned air continues to flow inside the intake passage 73, arrives at the accumulator 73B, and is supplied to the intake ports at the respective cylinders of the engine 71 via the throttle body.

The exhaust passage 74 extends rearward from exhaust ports (not shown) at the respective cylinders of the engine 71. A muffler 74A is provided at a rear end portion of the exhaust passage 74. The muffler 74A is fixed to the rear frame 4C. Exhaust gas generated in the engine 71 flows through the exhaust passage 74 and is discharged from the muffler 74A.

The radiator 75 is located farther forward than the intake box 73A and is coupled to the front frame 4B. The radiator 75 and the engine 71 are linked via a cooling pipe 82. Cooling water flows through the cooling pipe 82 and is thus circulated between the radiator 75 and the engine 71. The circulated cooling water is cooled when flowing through the radiator 75 and cools the engine 71 when flowing through the engine 71.

The batteries 76 supply electric power to electrical elements (not shown) in the vehicle 1. The batteries 76 are provided, for example, one each at the right and the left of the intake box 73A and are fixed to the front frame 4B.

The transmission 77 includes a front propeller shaft 83, a rear propeller shaft 84, front drive shafts 85, rear drive shafts 86, a front gearing 87, and a rear gearing 88. The front propeller shaft 83 extends forward from the engine 71, and the rear propeller shaft 84 extends rearward from the engine 71. A pair of right and left front drive shafts 85 extend rightward and leftward. Of the pair of front drive shafts 85, a left end of the front drive shaft 85L at the left is linked to the left front wheel 2L and a right end of the front drive shaft 85R at the right is linked to the right front wheel 2R. Similarly, a pair of right and left rear drive shafts 86 extend rightward and leftward. Of the pair of rear drive shafts 86, a left end of the rear drive shaft 86L at the left is linked to the left rear wheel 3L and a right end of the rear drive shaft 86R at the right is linked to the right rear wheel 3R.

The front gearing 87 is coupled to the front frame 4B. The front gearing 87 is supported by the front frame 4B. The front gearing 87 links each of a right end of the front drive shaft 85L and a left end of the front drive shaft 85R to a front end of the front propeller shaft 83. The rear gearing 88 is coupled to the rear frame 4C. The rear gearing 88 is supported by the rear frame 4C. The rear gearing 88 links each of a right end of the rear drive shaft 86L and a left end of the rear drive shaft 86R to a rear end of the rear propeller shaft 84.

The continuously variable transmission 78 is preferably a belt transmission in the present preferred embodiment and is located to a side, and more specifically at the left of the engine 71. The fuel tank 72 located to the right of the engine 71 sandwiches the engine 71 with the continuously variable transmission 78. The shiftable transmission 79 is preferably a gear transmission and is located farther forward than the engine 71. The shiftable transmission 79 is shiftable, for example, to any of three shift stages of high speed, low speed, and reverse. The engine 71, the continuously variable transmission 78, and the shiftable transmission 79 are integral and define a drive unit 89.

An intake duct 91 and an exhaust duct 92 are connected to the continuously variable transmission 78. The intake duct 91 extends in the front-rear direction at a position lower than the feet of the occupants seated on the front seats 5. A front portion of the intake duct 91 is bent upward and a front end portion of the intake duct 91 is bent and extends forward. An air inlet 91A that takes air into the intake duct 91 is provided at a front end of the intake duct 91. The air inlet 91A is at the same or substantially the same height position as the air inlet 73D of the intake box 71A. A rear end portion of the intake duct 91 branches in two and is connected to the continuously variable transmission 78. The exhaust duct 92 extends, for example, rearward and upward from the continuously variable transmission 78. Air taken into the intake duct 91 from the air inlet 91A is guided into the continuously variable transmission 78 by the intake duct 91 and cools an interior of the continuously variable transmission 78. The air inside the continuously variable transmission 78 is discharged through the exhaust duct 92.

The shifter 80 includes an operation lever 93 extending in the up-down direction, a shift rod 94 extending in the forward-rearward direction, and a shift gate 95 holding the operation lever 93. The operation lever 93 is inserted in a groove 95A in the shift gate 95 and is movable forward and rearward along the groove 95A. A lower end of the operation lever 93 and a front end of the shift rod 94 are mutually coupled by a ball joint 96 (see FIG. 3). A rear end of the shift rod 94 is coupled to the shiftable transmission 79. The shift gate 95 is fixed to the intermediate frame 4A. When the driver seated on the left front seat 5AL grips an upper end portion of the operation lever 93 and moves it forward or rearward, a shifting operation force by the driver is input into the shiftable transmission 79 and the shiftable transmission 79 is shifted.

A rotational power of the engine 71 is continuously shifted by the continuously variable transmission 78 and then transmitted to the shiftable transmission 79. The rotational power transmitted to the shiftable transmission 79 is shifted at a shift ratio of a shift stage among high speed, low speed, and reverse by the shiftable transmission 79 and then transmitted to the front propeller shaft 83 and the rear propeller shaft 84. The rotational power transmitted to the front propeller shaft 83 is transmitted to the front gearing 87. The front gearing 87 transmits the rotational power to the front drive shafts 85L and 85R. The rotational power is thus transmitted to the right and left front wheels 2. The rotational power transmitted to the rear propeller shaft 84 is transmitted to the rear gearing 88. The rear gearing 88 transmits the rotational power to the rear drive shafts 86L and 86R. The rotational power is thus transmitted to the right and left rear wheels 3. The front gearing 87 of the present preferred embodiment includes a differential gear and transmits the rotational power from the front propeller shaft 83 to the front drive shafts 85L and 85R while allowing a rotational difference between the front drive shafts 85L and 85R. The rear gearing 88 may or may not include a differential gear.

Figure 4:
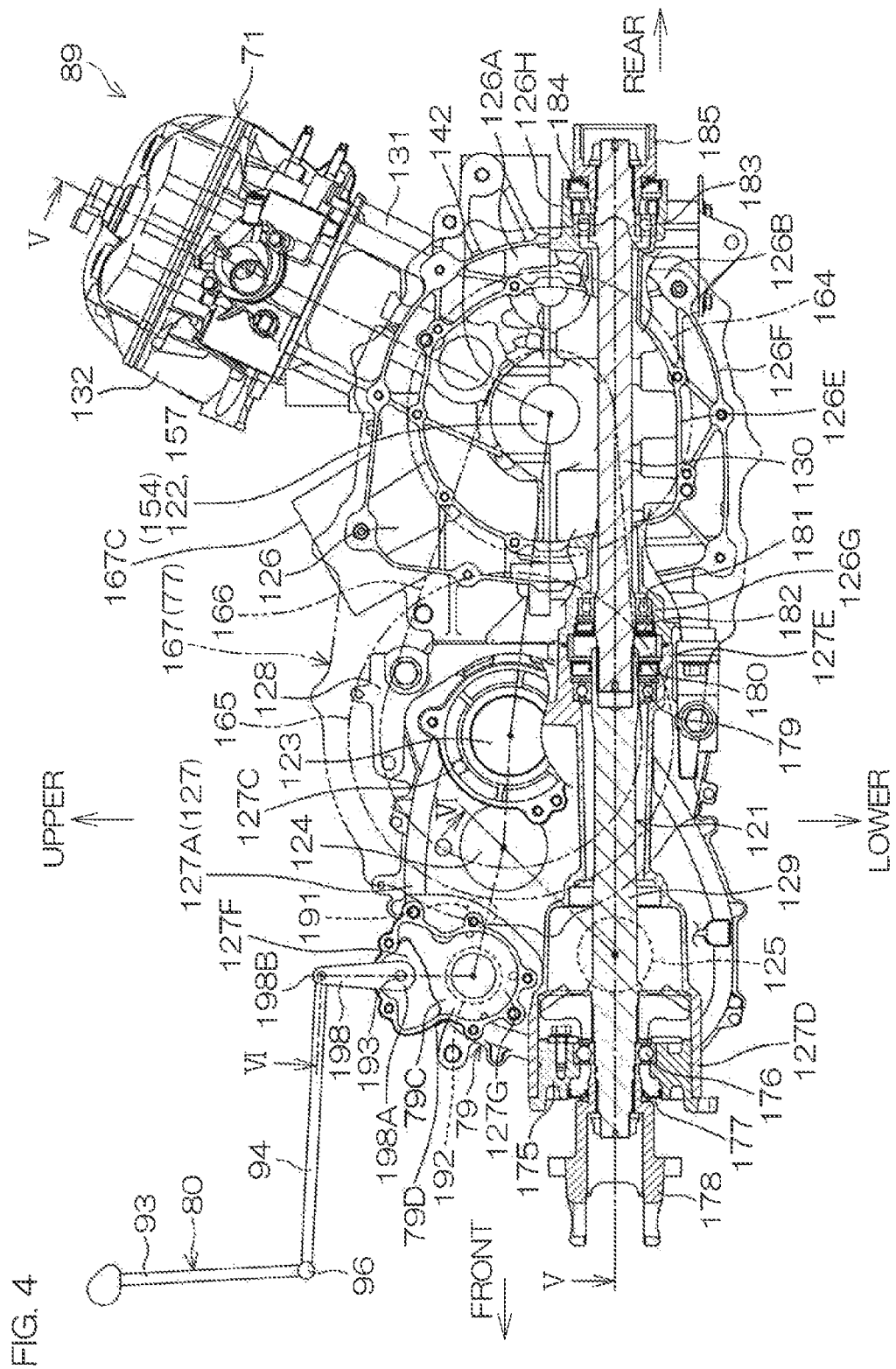
FIG. 4 is a side view of a drive unit included in the vehicle.
Figure 5:
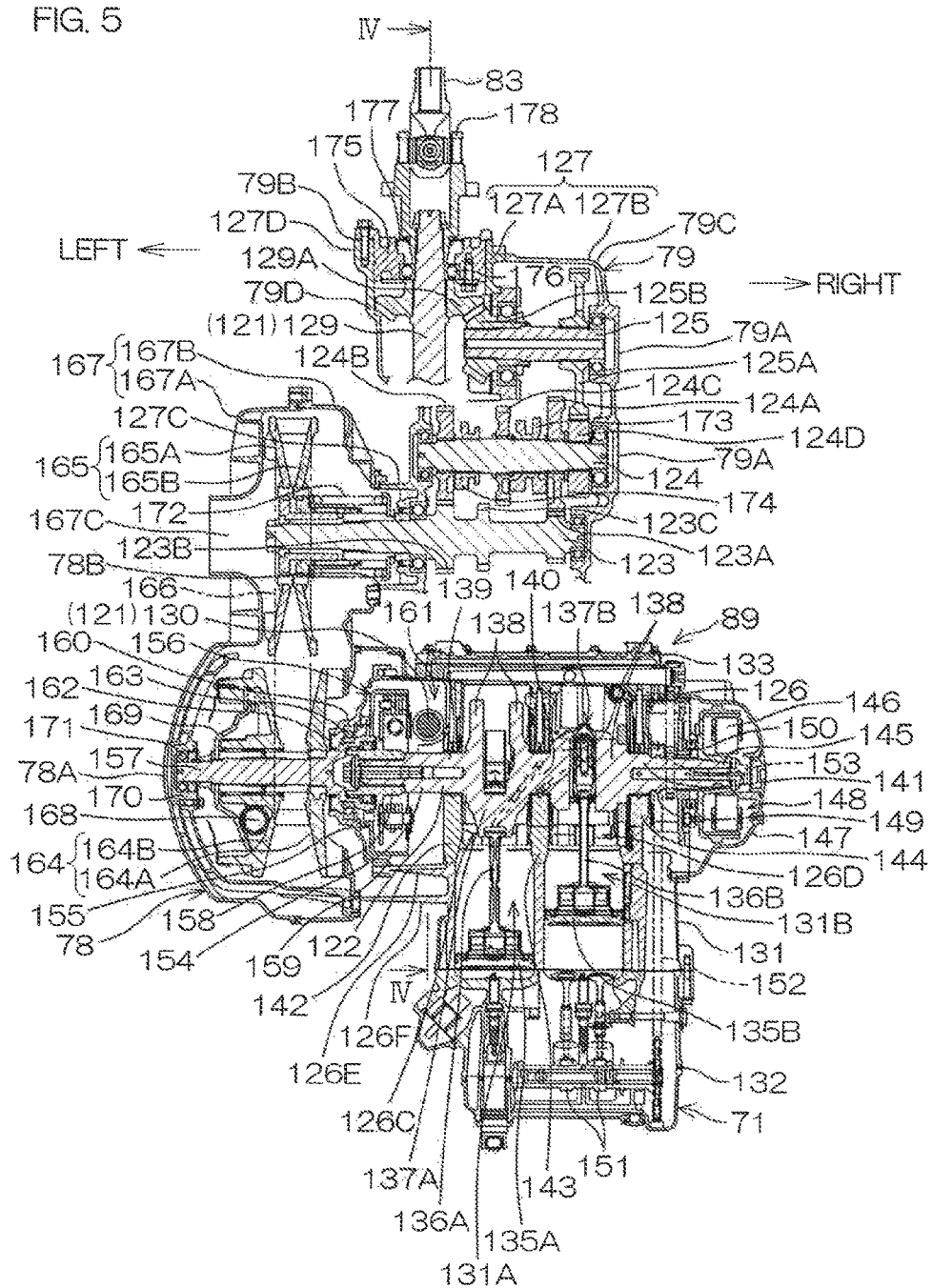
FIG. 5 is a developed sectional view of the drive unit taken along line V-V of FIG. 4.

FIG. 4 is a left side view of the drive unit 89. In FIG. 4, a section passing through an axial center of a propeller shaft 121 (line IV-IV of FIG. 5) is shown to illustrate a structure of the propeller shaft 121 and a peripheral thereof of the drive unit 89. FIG. 5 is a developed sectional view when the drive unit 89 is sectioned along line V-V of FIG. 4. The line V-V is a polygonal line connecting respective axial centers of a crankshaft 122, a secondary shaft 123, a transmission shaft 124, and an output shaft 125, to be described below, in that order.

The engine 71 includes the crankshaft 122. The crankshaft 122 is an example of an output shaft and a drive shaft according to a preferred embodiment of the present invention. The crankshaft 122 is oriented in the right-left direction. The continuously variable transmission 78 includes the secondary shaft 123. The secondary shaft 123 is an example of a first output shaft according to a preferred embodiment of the present invention. The shiftable transmission 79 includes the transmission shaft 124 and the output shaft 125. The transmission shaft 124 is an example of a second input shaft according to a preferred embodiment of the present invention, and the output shaft 125 is an example of a second output shaft according to a preferred embodiment of the present invention. The secondary shaft 123, the transmission shaft 124, and the output shaft 125 extend parallel or substantially parallel to the crankshaft 122. The secondary shaft 123 is located farther forward than the crankshaft 122. The transmission shaft 124 is located farther forward than the secondary shaft 123. The output shaft 125 is located farther forward than the transmission shaft 124.

The engine 71 includes a crankcase 126 housing the crankshaft 122. The shiftable transmission 79 includes a transmission case 127, housing a right portion of the secondary shaft 123, the transmission shaft 124, and the output shaft 125. The transmission case 127 is located in front of the crankcase 126, and the crankcase 126 and the transmission case 127 are mutually linked via an adapter 128.

The propeller shaft 121 extends in the front-rear direction. The propeller shaft 121 is located below the crankshaft 122, the secondary shaft 123, and the transmission shaft 124 and is perpendicular or substantially perpendicular to the shafts 122, 123, and 124 in plan view. A central axis of the propeller shaft 121 and a central axis of the output shaft 125 are located at the same height position. The propeller shaft 121 includes a front shaft 129 that penetrates forward and rearward through the transmission case 127, and a rear shaft 130 that penetrates forward and rearward through the crankcase 126, and the front shaft 129 and the rear shaft 130 are mutually linked.

The crankcase 126 is divisible above and below into an upper crankcase 126A and a lower crankcase 126B at a horizontal boundary plane passing through the axial center of the crankshaft 122. A cylinder block 131 is joined to an upper portion of the upper crankcase 126A, and a cylinder head 132 is joined to an upper portion of the cylinder block 131. An oil pan 133 is joined to a lower portion of the lower crankcase 126B.

Two cylinder bores 131A and 131B are provided at the right and left in the cylinder block 131. Pistons 135A and 135B are respectively inserted in interiors of the cylinder bores 131A and 131B. The pistons 135A and 135B are linked to the crankshaft 122 via connecting rods 136A and 136B, respectively.

The crankshaft 122 includes a pair of right and left crankpins 137B and 137A, crank webs 138, and crank journals 139, 140, and 141. The crankpins 137A and 137B are linked to the connecting rods 136A and 136B, respectively. The plurality of crank webs 138 are linked so as to sandwich the crankpins 137A and 137B respectively. The crank journals 139, 140, and 141 are respectively linked to the crank webs 138.

Two crank chambers 126D and 126C aligned in the right-left direction are provided inside the crankcase 126. The crankcase 126 includes three supporting wall portions 144, 143, and 142 aligned in the right-left direction. The left crank chamber 126C is provided between the left supporting wall portion 142 and the middle supporting wall portion 143. The right crank chamber 126D is provided between the middle supporting wall portion 143 and the right supporting wall portion 144.

The left crankpin 137A and the pair of crank webs 138 that sandwich it are housed in the left crank chamber 126C. The right crankpin 137B and the pair of crank webs 138 that sandwich it are housed in the right crank chamber 126D. The left crank journal 139 is rotatably supported by the left supporting wall portion 142. The middle crank journal 140 is rotatably supported by the middle supporting wall portion 143. The right crank journal 141 is rotatably supported by the right supporting wall portion 144.

The crankshaft 122 further includes a right extension 145 extending outward to the right from the right supporting wall portion 144 of the crankcase 126. A generator 146 is mounted to the right extension 145. A generator cover 147 is mounted to a right side surface of the crankcase 126. A generator chamber 148 housing the generator 146, is provided between the crankcase 126 and the generator cover 147. A gear 149 and a gear 150 are provided at the right extension 145 between the supporting wall portion 144 and the generator 146. The gear 149 drives a cam 151 provided on the cylinder head 132 via a cam chain 152. The gear 150 drives a pump unit (not shown) via a pump chain 153.

The crankshaft 122 further includes a left extension 154 extending outward to the left from the supporting wall portion 142 of the crankcase 126. The drive unit 89 further includes a clutch structure 155. The clutch structure 155 includes a centrifugal clutch 156. The centrifugal clutch 156 is located at a tip portion of the left extension 154. The centrifugal clutch 156 is located coaxially to the crankshaft 122. A gap that receives the rear shaft 130 of the propeller shaft 121 is provided between the supporting wall portion 142 and the centrifugal clutch 156.

The continuously variable transmission 78 includes a primary shaft 157. The primary shaft 157 is located to the left of the left extension 154. The primary shaft 157 is an example of an input shaft and a first input shaft according to a preferred embodiment of the present invention. The left extension 154 and the primary shaft 157 are linked coaxially via the centrifugal clutch 156. The centrifugal clutch 156 includes a clutch input shaft 158 and a clutch output shaft 159. The clutch input shaft 158 is mounted to the left extension 154, and the clutch output shaft 159 is mounted to the primary shaft 157. Due to a centrifugal force accompanying rotation of the crankshaft 122, an outer circumferential surface of the clutch input shaft 158 is pressed against an inner circumferential surface of the clutch output shaft 159. A rotational power of the crankshaft 122 is thus input into the primary shaft 157.

A clutch cover 160 is mounted to a left side surface of the crankcase 126. An annular edge portion 126E extending to the left and surrounding the left extension 154 is provided at the left side surface of the crankcase 126. Due to the clutch cover 160 being joined to the edge portion 126E, a clutch chamber 161 is defined by the clutch cover 160 and the left side surface of the crankcase 126. The clutch structure 155 is housed in the clutch chamber 161. A left end portion of the clutch output shaft 159 penetrates through the clutch cover 160 and is linked to a right end portion of the primary shaft 157. A gap between the left end portion of the clutch output shaft 159 and the clutch cover 160 is sealed by a seal 162.

The clutch output shaft 159 is rotatably supported by the clutch cover 160 via a bearing 163.

The continuously variable transmission 78 includes a drive pulley 164, a driven pulley 165, and a belt 166. The drive pulley 164 is mounted to the primary shaft 157. The driven pulley 165 is located farther forward than the drive pulley 164 and is mounted to a left end portion of the secondary shaft 123. The belt 166 is preferably made of rubber or metal, for example, and is wound around the drive pulley 164 and the driven pulley 165.

The continuously variable transmission 78 includes a CVT case 167. The CVT case 167 houses the primary shaft 157, the drive pulley 164, the driven pulley 165, the belt 166, and a left portion of the secondary shaft 123. The CVT case 167 is separate from the crankcase 126 and the transmission case 127 and is located to the left of the crankcase 126 and the transmission case 127. The CVT case 167 is divisible to the right and left into a right CVT case 167B and a left CVT case 167A. An annular edge portion 126F extending to the left and surrounding the edge portion 126E which defines the clutch chamber 161 is provided at the left side surface of the crankcase 126. A left end portion of the edge portion 126F is joined to a rear portion of the right CVT case 167B.

A connection port 167C to which the intake duct 91 (see FIG. 2) is connected, is provided in a left side surface of a front portion of the left CVT case 167A. Another connection port 167C is provided in an upper surface of the edge portion 126F. A connection port (not shown) to which the exhaust duct 92 (see FIG. 2) is connected, is provided in an upper surface of a rear portion of the left CVT case 167A. A left side surface of the rear portion of the left CVT case 167A bulges to the left and a left end of the left side surface defines a left end 78A of the continuously variable transmission 78.

The drive pulley 164 includes a fixed sheave 164A fixed to the primary shaft 157, and a movable sheave 164B provided on the primary shaft 157 so as to be movable to the right and left. A weight 168 is located between the movable sheave 164B and a cam plate 169 fixed to the primary shaft 157. The weight 168 moves the movable sheave 164B to the right and left due to a centrifugal force accompanying rotation of the primary shaft 157. A left end portion of the primary shaft 157 is supported by a cylindrical housing 170 provided inside the left CVT case 167A via a bearing 171.

The driven pulley 165 includes a fixed sheave 165A fixed to the left end portion of the secondary shaft 123, and a movable sheave 165B provided on the secondary shaft 123 so as to be movable to the right and left. The movable sheave 165B is urged in a direction (leftward) toward the fixed sheave 165A by a coil spring 172.

With the continuously variable transmission 78, a distance between the fixed sheave 164A and the movable sheave 164B, and a distance between the fixed sheave 165A and the movable sheave 165B change. The rotational power of the primary shaft 157 is thus output and continuously shifted from the secondary shaft 123 to the shiftable transmission 79.

The transmission case 127 of the shiftable transmission 79 is divisible to the right and left into a right transmission case 127B and a left transmission case 127A. An edge portion 127C extending to the left and surrounding the secondary shaft 123, is provided on a left side surface of a rear portion of the left transmission case 127A. A left end portion of the edge portion 127C is joined to a right side surface of a front portion of the right CVT case 167B. A right end of the right side surface of the front portion of the right CVT case 167B defines a right end 78B of the continuously variable transmission 78. A right side surface of a portion of a right wall of the right transmission case 127B that faces the transmission shaft 124 and the output shaft 125 from the right defines a right end 79A of the shiftable transmission 79.

A low drive gear 123A, a high drive gear 123B, and a reverse drive gear 123C are provided integrally on a right portion of the secondary shaft 123. The low drive gear 123A, the reverse drive gear 123C, and the high drive gear 123B are aligned in that order from the right. A low driven gear 124A, a high driven gear 124B, and a reverse driven gear 124C are installed on the transmission shaft 124 so as to be relatively rotatable to the transmission shaft 124. The low driven gear 124A, the reverse driven gear 124C, and the high driven gear 125B are aligned in that order from the right. The low drive gear 123A and the low driven gear 124A are engaged with each other. The high drive gear 123B and the high driven gear 124B are engaged with each other. The reverse drive gear 123C and the reverse driven gear 124C are engaged with a gear (not shown) provided on a countershaft (not shown). The reverse driven gear 124C thus rotates in reverse to the low driven gear 124A and the high driven gear 124B.

Dog clutches 173 and 174 are installed on the transmission shaft 124 so as to be movable relatively to the right and left. The dog clutch 173 is located between the low driven gear 124A and the reverse driven gear 124C and is splined to the transmission shaft 124. The dog clutch 174 is located between the high driven gear 124B and the reverse driven gear 124C and is splined to the transmission shaft 124.

A drive gear 124D is splined to a right end portion of the transmission shaft 124. A driven gear 125A engaged with the drive gear 124D is splined to a right end portion of the output shaft 125. A bevel gear 125B is splined to a left end portion of the output shaft 125. A bevel gear 129A engaged with the bevel gear 125B is splined to the front shaft 129 of the propeller shaft 121.

In a state in which the dog clutch 173 is engaged with the low driven gear 124A, the transmission shaft 124 rotates together with the low driven gear 124A. A rotational power of the transmission shaft 124 is shifted to a low speed shift stage and transmitted to the output shaft 125. In a state in which the dog clutch 174 is engaged with the high driven gear 124B, the transmission shaft 124 rotates together with the high driven gear 124B. The rotational power of the transmission shaft 124 is shifted to a high speed shift stage and transmitted to the output shaft 125. In a state in which the dog clutch 173 is engaged with the reverse driven gear 124C, the transmission shaft 124 rotates together with the reverse driven gear 124C. The rotational power of the transmission shaft 124 is shifted to a reverse shift stage and transmitted to the output shaft 125. The rotational power of the output shaft 125 is transmitted to the front shaft 129 of the propeller shaft 121 by the bevel gear 125B and the bevel gear 129A.

The shiftable transmission 79 thus inputs the rotational power of the secondary shaft 123 into the transmission shaft 124 and shifts to any shift stage among high speed, low speed, and reverse. The shiftable transmission 79 then outputs the rotational power input into the transmission shaft 124 to the output shaft 125 and transmits the rotational power from the output shaft 125 to the front shaft 129.

A front end portion of the front shaft 129 penetrates forward and rearward through the transmission case 127 and projects forward from the transmission case 127. An annular shaft support 127D that projects forward is provided at a front wall of the left transmission case 127A. A left end of the shaft support 127D is located farther leftward than a left end of the edge portion 127C connected to the left transmission case 127A and defines a left end 79B of the shiftable transmission 79. An annular cap 175 is fitted inside the shaft support 127D. The front end portion of the front shaft 129 is supported by the cap 175 via a bearing 176. A gap between the front end portion of the front shaft 129 and the cap 175 is sealed by a seal 177. The front end portion of the front shaft 129 is linked to a rear end portion of the front propeller shaft 83 via a linkage 178. The front shaft 129 and the linkage 178 may be portions of the front propeller shaft 83.

Referring to FIG. 4, a rear end portion of the front shaft 129 projects rearward from the transmission case 127. An annular shaft support 127E is provided at a rear wall of the transmission case 127. The rear end portion of the front shaft 129 is supported by the shaft support 127E via a bearing 179. A gap between the rear end portion of the front shaft 129 and the shaft support 127E is sealed by a seal 180.

A front end portion of the rear shaft 130 projects forward from the crankcase 126. An annular shaft support 126G is provided at a front wall of the crankcase 126. The front end portion of the rear shaft 130 is supported by the shaft support 126G via a bearing 181. A gap between the front end portion of the rear shaft 130 and the shaft support 126G is sealed by a seal 182. The front end portion of the rear shaft 130 is splined to the rear end portion of the front shaft 129. The front shaft 129 and the rear shaft 130 are thus linked to define the propeller shaft 121.

A rear end portion of the rear shaft 130 penetrates forward and rearward through the crankcase 126 and projects rearward from the crankcase 126. An annular shaft support 126H that projects rearward is provided at a rear wall of the crankcase 126. The rear end portion of the rear shaft 130 is supported by the shaft support 126H via a bearing 183. A gap between the rear end portion of the rear shaft 130 and the shaft support 126H is sealed by a seal 184. The rear end portion of the rear shaft 130 is linked to a front end portion of the rear propeller shaft 84 (see FIG. 3) via a linkage 185. The rear shaft 130 and the linkage 185 may be portions of the rear propeller shaft 84.

The rotational power transmitted from the output shaft 125 to the front shaft 129 is transmitted to the front propeller shaft 83 and the rear propeller shaft 84 of the transmission 77, and transmitted to the front wheel 2 and the rear wheel 3 as mentioned above.

Figure 6:
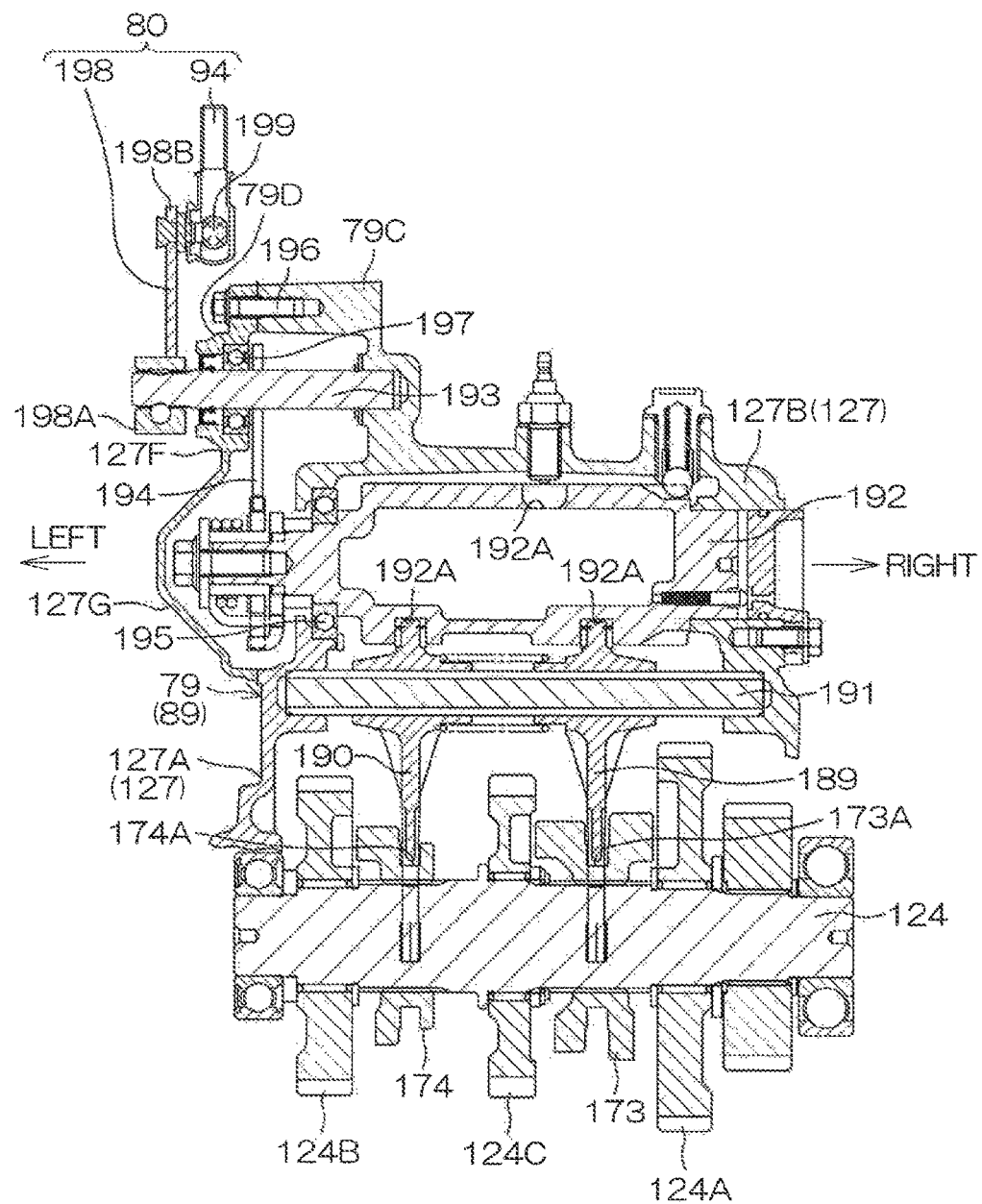
FIG. 6 is a developed sectional view of the drive unit taken along line VI-VI of FIG. 4.

FIG. 6 is a developed sectional view of the drive unit 89 taken along line VI-VI of FIG. 4. The shiftable transmission 79 further includes shift forks 189 and 190, a guide shaft 191, a shift drum 192, a support shaft 193, and a transmission member 194.

The shift forks 189 and 190 are juxtaposed right and left inside the transmission case 127. The shift fork 189 is fitted in a groove 173A in an outer peripheral surface of the dog clutch 173. The shift fork 190 is fitted in a groove 174A in an outer peripheral surface of the dog clutch 174. The guide shaft 191 extends rightward and leftward, and is located in front of the transmission shaft 124 inside the transmission case 127. The shift forks 189 and 190 are spline coupled to the guide shaft 191 and are individually movable rightward and leftward.

The shift drum 192 extends rightward and leftward. Inside the transmission case 127, the shift drum 192 is located in front of the guide shaft 191 and is rotatably supported by the left transmission case 127A via a bearing 195. A portion of a left wall of the left transmission case 127A may be separable from the left transmission case 127A as a cover 127F. The cover 127F is fixed to the left transmission case 127A by a bolt 196, for example. A projection 127G having a substantially truncated conical shape projecting leftward is provided at a portion of the cover 127F facing the shift drum 192 from the left.

A groove 192A is provided in an outer peripheral surface of the shift drum 192. The groove 192A includes inclined portions that are inclined so as to shift rightward and leftward with respect to a rotation direction of the shift drum 192. The shift forks 189 and 190 are fitted in the groove 192A. When the shift fork 189 passes through an inclined portion of the groove 192A in accompaniment with rotation of the shift drum 192, the shift fork 189 is guided by the inclined portion and thus slides either rightward or leftward together with the dog clutch 173. The dog clutch 173 thus engages with the low driven gear 124A. When in this state, the shift drum 192 rotates in reverse, the dog clutch 173 separates from the low driven gear 124A and the engagement of the dog clutch 173 and the low driven gear 124A is thus released. When the shift drum 192 rotates in reverse further, the dog clutch 173 engages with the reverse driven gear 124C.

The rotation of the shift drum 192 is thus converted to rightward or leftward movement of the shift fork 189 by the groove 192A. Similarly, the rotation of the shift drum 192 is also converted to rightward or leftward movement of the shift fork 190 by the groove 192A. Therefore, when the shift drum 192 rotates, the shift fork 190 slides rightward or leftward together with the dog clutch 174. Thus, the dog clutch 174 engages with the high driven gear 124B or the engagement of the dog clutch 174 and the high driven gear 124B is released.

The support shaft 193 extends in the right-left direction. Inside the transmission case 127, the support shaft 193 is located above the shift drum 192 (see FIG. 4) and is rotatably supported by the cover 127F of the left transmission case 127A via a bearing 197. A left end portion of the support shaft 193 is exposed outward from a left side surface of the cover 127F.

The transmission member 194 includes a chain, belt, or linkage, etc., and is located inside the transmission case 127. The transmission member 194 links a portion of the support shaft 193 farther rightward than the bearing 197 and a portion of the shift drum 192 farther leftward than the bearing 195 and transmits a rotation of the support shaft 193 to the shift drum 192.

The shifter 80 described above further includes a switching lever 198. The switching lever 198 includes a base portion 198A and a tip portion 198B. The base portion 198A is integrally rotatably fixed to the left end portion of the support shaft 193. The tip portion 198B is linked to a rear end portion of the shift rod 94 via a ball joint 199. When the driver seated on the left front seat 5AL grips the operation lever 93 and operates it forward or rearward, the shifting operation force applied by the driver is transmitted to the switching lever 198 via the shift rod 94. Thus, the switching lever 198 swings together with the support shaft 193. In linkage with the rotation of the support shaft 193, the shift drum 192 rotates and the shift forks 189 and 190 slide rightward or leftward. The shiftable transmission 79 is thus shifted by the shifting operation force being input by the switching lever 198.

Figure 7:
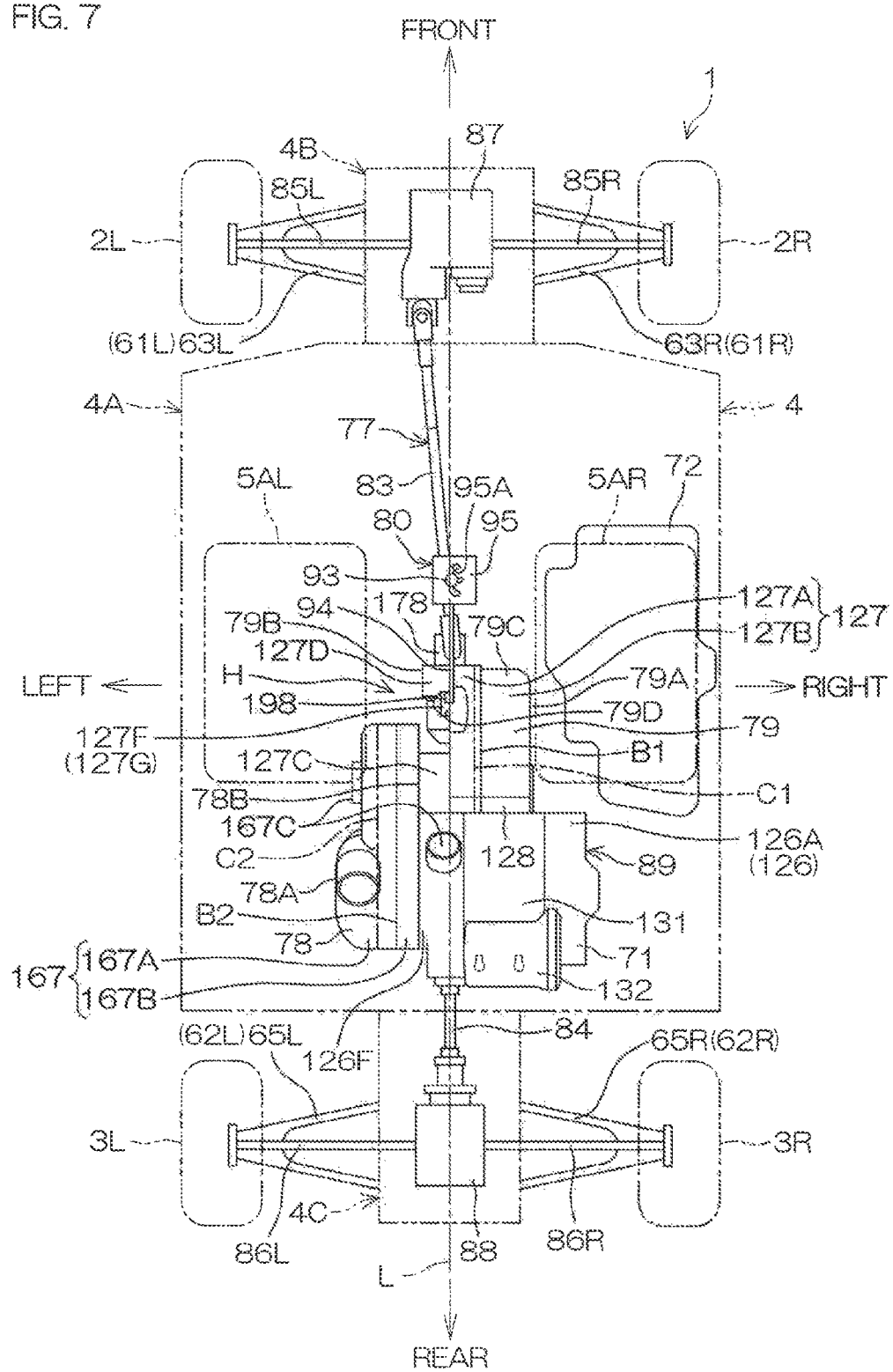
FIG. 7 is a schematic plan view of the vehicle.

FIG. 7 is a schematic plan view of the vehicle 1 with principal portions of FIG. 2 being extracted. At least a portion of the continuously variable transmission 78 (specifically, the front portion of the left CVT case 167A) is located below the left front seat 5AL in plan view. The shiftable transmission 79 is located on the same side (to the right in the present preferred embodiment) in the right-left direction as the engine 71 with respect to the continuously variable transmission 78. As mentioned above, the secondary shaft 123 is located farther forward than the primary shaft 157 that is located coaxially to the crankshaft 122. The transmission shaft 124 is located farther forward than the secondary shaft 123. The output shaft 125 is located farther forward than the transmission shaft 125. With such a layout, the shiftable transmission 79 is provided with a projection 79C projecting farther forward than the continuously variable transmission 78. The shaft support 127D and the cover 127F are located at the projection 79C. At least a portion of the projection 79C is located between the two front seats 5A in plan view.

In regard to the right-left direction, the switching lever 198 is located on the same side (to the left in the present preferred embodiment) as the continuously variable transmission 78 with respect to a center C1 of the shiftable transmission 79. The center C1 is positioned between the left end 79B and the right end 79A of the shiftable transmission 79. A right-left distance between the center C1 and the left end 79B is equal or substantially equal to a right-left distance between the center C1 and the right end 79A. The center C1 may be positioned farther leftward than a boundary B1 between the left transmission case 127A and the right transmission case 127B.

The switching lever 198 is located between a center C2 in the right-left direction of the continuously variable transmission 78 and the center C1 of the shiftable transmission 79 in plan view. The center C2 is positioned between the left end 78A and the right end 78B of the continuously variable transmission 78. A right-left distance between the center C2 and the left end 78A is equal or substantially equal to a right-left distance between the center C2 and the right end 78B. The center C2 may be positioned farther leftward than a boundary B2 between the left CVT case 167A and the right CVT case 167B.

The switching lever 198 is provided at a left side surface 79D of the projection 79C. The left side surface 79D is an example of a side surface of the projection 79C closer to the continuously variable transmission 78 according to a preferred embodiment of the present invention and is a front portion of a left side surface of the left transmission case 127A. The base portion 198A of the switching lever 198 is provided at a portion higher than the projection 127G at the left side surface of the cover 127F that defines a portion of the left transmission case 127A (see FIG. 4). The portion of the left side surface 79D at which the switching lever 198 is provided is positioned farther rightward and higher than the left end 79B of the shiftable transmission 79.

The switching lever 198 is located in proximity to the driver seated on the left front seat 5AL. The switching lever 198, the shift rod 94 linked to the switching lever 198, and the operation lever 93 linked to the shift rod 94 are located between the two front seats 5A in plan view. Also, the switching lever 198, the shift rod 94, and the operation lever 93 are located in a vicinity of the centerline L of the vehicle 1, that is, at the center or substantially the center of the vehicle 1. A rear portion of the shift rod 94 is linked to the switching lever 198 and passes under the accumulator 73B of the intake passage 73 (see FIG. 2).

As described above, with the structural arrangement according to a preferred embodiment of the present invention, in regard to the right-left direction, the continuously variable transmission 78 is located at a side (the left side, here) of the engine 71 and the shiftable transmission 79 is located on the same side (at the right side, here) as the engine 71 with respect to the continuously variable transmission 78.

The switching lever 198 which inputs the shifting operation force applied to the operation lever 93 by the driver into the shiftable transmission 79 is located on the same side (to the left, here) as the continuously variable transmission 78 with respect to the center C1 of the shiftable transmission 79. With such a layout, the switching lever 198 and the operation lever 93 are located at the same or substantially the same position in the right-left direction. The shift rod 94 that connects these levers 198 and 93 is thus located along the front-rear direction or substantially the front-rear direction.

When an operation direction of the operation lever 93 is the front-rear direction or substantially the front-rear direction, an intersection angle in plan view of the operation direction of the operation lever 93 and the shift rod 94 is small. A proportion of the driver's shifting operation force that is lost by a component force in a right-left direction is thus decreased. A large shifting operation force is thus unnecessary and therefore the strength of the shift rod 94 does not have to be increased more than necessary. The strength of the shift rod 94 is thus optimized. Also, transmission efficiency of the shifting operation force from the operation lever 93 to the switching lever 198 is improved and therefore the driver is able to operate the operation lever 93 even with a small shift load. That is, the shift load is able to be reduced. Improved operation feeling of the operation lever 93 is thus enabled.

According to a preferred embodiment of the present invention, the shiftable transmission 79 is located in front of the engine 71. The switching lever 198 provided to the shiftable transmission 79, is thus close to the operation lever 93 and therefore the shift rod 94 is able to be short. The transmission efficiency of the shifting operation force from the operation lever 93 to the switching lever 198 is thus further improved to achieve greater reduction in the shift load.

According to a preferred embodiment of the present invention, the switching lever 198 is located between the center C2 of the continuously variable transmission 78 and the center C1 of the shiftable transmission 79 in plan view. The switching lever 198 is thus reliably located on the same side as the continuously variable transmission 78 with respect to the center C1 of the shiftable transmission 79 in regard to the right-left direction.

According to a preferred embodiment of the present invention, at least a portion of the engine 71 is located between the two front seats 5A in plan view, and at least a portion of the continuously variable transmission 78 located to the left of the engine 71 is located below one of the seats 5A in plan view. With this structural arrangement, to secure a minimum ground clearance of the vehicle 1, the shiftable transmission 79 is located in front of the engine 71, and the primary shaft 157, the secondary shaft 123, the transmission shaft 124, and the output shaft 125 are located side by side in that order from the rear (see FIG. 4). The shiftable transmission 79 includes the projection 79C projecting farther forward than the continuously variable transmission 78, and accordingly, a space H is provided to the left of the shiftable transmission 79, that is, in front of the continuously variable transmission 78 (see FIG. 7). In the space H, the switching lever 198 is provided at the left side surface 79D of the projection 79C. The switching lever 198 is thus reliably located on the same side as the continuously variable transmission 78 with respect to the center C1 of the shiftable transmission 79 in regard to the right-left direction. Also, the transmission shaft 124 and the output shaft 125 of the shiftable transmission 79 are located farther forward than the primary shaft 157 of the continuously variable transmission 78, and therefore the secondary shaft 123 of the continuously variable transmission 78 is able to be located at a low position. Designing at least a portion of the continuously variable transmission 78 to be located below the seat 5AL is thus facilitated.

According to a preferred embodiment of the present invention, the switching lever 198 is provided at the left side surface 79D of the projection 79C that is closer to the continuously variable transmission 78. The switching lever 198 is thus reliably located on the same side as the continuously variable transmission 78 with respect to the center C1 of the shiftable transmission 79. Also, the location of the switching lever 198 is able to make effective use of the space H in front of the continuously variable transmission 78.

According to a preferred embodiment of the present invention, at least a portion of the projection 79C is located between two seats 5 in plan view. At least a portion of the shiftable transmission 79, which is a heavy object, is thus located at the center or substantially the center of the vehicle 1 in the right-left direction as with the engine 71, thus improving the motion performance of the vehicle 1.

According to a preferred embodiment of the present invention, the switching lever 198 and the operation lever 93 are located between two seats 5 in plan view. The switching lever 198 and the operation lever 93 are thus aligned in the front-rear direction or substantially in the front-rear direction between the two seats 5, and therefore the shift rod 94 connecting these levers is reliably located along the front-rear direction or substantially the front-rear direction. Therefore, when the operation direction of the operation lever 93 is the front-rear direction or substantially the front-rear direction, the proportion of the driver's shifting operation force lost by the component force in the right-left direction is decreased. Therefore, as mentioned above, the strength of the shift rod 94 does not have to be increased more than necessary and the shift load is reduced.

According to a preferred embodiment of the present invention, the switching lever 198 is located at the center or substantially the center of the vehicle 1 in the right-left direction. At least a portion of the shiftable transmission 79 which is provided with the switching lever 198 and is a heavy object, is thus located at the center or substantially the center of the vehicle 1 in the right-left direction, thus improving the motion performance of the vehicle 1.

According to a preferred embodiment of the present invention, the fuel tank 72 is located at a position that sandwiches the engine 71 with the continuously variable transmission 78. The continuously variable transmission 78 is thus spaced away from the fuel tank 72 and therefore maintenance of the continuously variable transmission 78 is able to be performed without removing the fuel tank 72 from the vehicle 1.

Although preferred embodiments of the present invention have been described above, the present invention is not restricted to the contents of these preferred embodiments and various modifications are possible within the scope of the present invention.

As long as it is possible to dispose the shift rod 94 along the front-rear direction or substantially along the front-rear direction, the switching lever 198 may be provided at a front surface or a lower surface or an upper surface of the projection 79C of the shiftable transmission 79 instead of at the left side surface 79D of the projection 79C.

Although two seats 5 are preferably aligned in the right-left direction, three or more seats 5 may be aligned in the right-left direction.

The vehicle 1 preferably includes the pair of front wheels 2L and 2R and the pair of rear wheels 3L and 3R. However, a vehicle according to a preferred embodiment of the present invention may include two or more pairs of front wheels 2 and may include two or more pairs of rear wheels 3.

Although the vehicle 1 is preferably a recreational off-road vehicle, the vehicle according to a preferred embodiment of the present invention may be a utility vehicle of any category. A general utility vehicle includes a frame structure and vehicle wheels suitable for off-road travel.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   two seats juxtaposed in a right-left direction of the vehicle;
   an engine including at least a portion located between the two seats in a plan view of the vehicle;
   a continuously variable transmission located to a side of the engine with at least a portion thereof located below one of the two seats in the plan view and to which a rotational power from the engine is transmitted;
   a shiftable transmission located on a same side as the engine in the right-left direction with respect to the continuously variable transmission and to which a rotational power from the continuously variable transmission is transmitted;
   a transmission that transmits the rotational power from the shiftable transmission to a vehicle wheel;
   a switching lever on a same side as the continuously variable transmission with respect to a center of the shiftable transmission in the right-left direction, and that inputs a shifting operation force into the shiftable transmission;
   a shift rod linked to the switching lever; and
   an operation lever operated by a driver seated on the seat to shift the shiftable transmission, and linked to the shift rod.

2. The vehicle according to claim 1, wherein the shiftable transmission is located in front of the engine.

3. The vehicle according to claim 1, wherein the switching lever is located between a center of the continuously variable transmission in the right-left direction and the center of the shiftable transmission in the plan view.

4. The vehicle according to claim 3, wherein
   the engine includes an output shaft oriented in the right-left direction;
   the continuously variable transmission includes a first input shaft into which a rotational power from the output shaft is input, and a first output shaft located farther forward than the first input shaft to output the rotational power input into the first input shaft;
   the shiftable transmission includes a second input shaft which is located farther forward than the first output shaft and into which the rotational power output from the first output shaft is input, and a second output shaft located farther forward than the second input shaft to output the rotational power input into the second input shaft to the transmission; and the switching lever is located at a projection of the shiftable transmission that projects farther forward than the continuously variable transmission.

5. The vehicle according to claim 4, wherein the switching lever is provided at a first side surface of the projection that is closer to the continuously variable transmission than is a second side surface of the projection opposite to the first side surface.

6. The vehicle according to claim 5, wherein at least a portion of the projection is located between the two seats in the plan view.

7. The vehicle according to claim 6, wherein the switching lever and the operation lever are located between the two seats in the plan view.

8. The vehicle according to claim 7, wherein the switching lever is located at a center or substantially a center of the vehicle in the right-left direction.

9. The vehicle according to claim 1, further comprising:
a fuel tank that stores fuel for the engine and is located at a position that sandwiches the engine with the continuously variable transmission.

\* \* \* \* \*